United States Patent [19]

Laing

[11] 4,064,931
[45] Dec. 27, 1977

[54] FUSION-TYPE THERMAL STORAGE ACCUMULATOR WITH DISCHARGING APPARATUS

[76] Inventor: Nikolaus Laing, Hofener Weg 35-37, 7141 Aldingen, Germany

[21] Appl. No.: 616,241

[22] Filed: Sept. 24, 1975

[30] Foreign Application Priority Data

Sept. 30, 1974 Austria .................................. 7857/74

[51] Int. Cl.² ............................................ F28D 21/00
[52] U.S. Cl. .......................................... 165/1; 62/59; 165/94; 165/104 S; 165/DIG. 1; 126/400
[58] Field of Search ............... 165/104 S, DIG. 4, 94, 165/1; 126/400; 62/354, 59; 219/325, 341, 365, 378

[56] References Cited

U.S. PATENT DOCUMENTS

| 914,183 | 3/1909 | Porges et al. | 62/354 X |
| 1,969,187 | 8/1934 | Schutt | 62/59 X |
| 2,902,839 | 9/1959 | Marshall | 165/104 S X |

Primary Examiner—Albert W. Davis, Jr.
Attorney, Agent, or Firm—Pennie & Edmonds

[57] ABSTRACT

Apparatus and method for thermally discharging a heat storage accumulator containing a fusible storage substance the density of which is greater in the solid state than in the liquid state where the apparatus has means for creating a fluid vortex of the storage substance and scraper means for scraping crystallized storage substance off a heat sink portion of the accumulator such that crystallized storage substance is removed from the heat sink and transferred to the periphery of the accumulator.

7 Claims, 2 Drawing Figures

FUSION-TYPE THERMAL STORAGE ACCUMULATOR WITH DISCHARGING APPARATUS

BACKGROUND OF THE INVENTION

The invention is concerned with thermal storage accumulators which are capable of transmitting the heat of crystallisation of fusible substances.

Storage accumulators for the storage of latent heat energy continue to gain in importance. At a high heat flux density, the thermal discharge of these accumulators encounters substantial difficulties because crusts of thermally depleted storage substance form on the surface of the heat sink portions of the accumulators. As their thickness builds up, these crusts increasingly inhibit heat transmission so that the full rate of heat withdrawal from the accumulators can only be achieved at the very first instant

DESCRIPTION OF THE INVENTION

The invention avoids this drawback. The invention provides, inside an accumulator container, a heat sink component, which rotates or else is equipped with a stripping device rotating around it. In this way, the storage substance, which is continuously thermally discharged by the heat transfer surfaces of the heat sink and builds up as a crust, is thrown off or stripped off these surfaces so that the favourable initial condition of a stationary accumulator endures. By this means, it becomes possible to accomplish the thermal discharge of the accumulator at high rates of heat flow. The heat sink component is advantageously arranged at the centre of the accumulator container. A fluid vortex is then formed by which the solid portions of the storage substance of higher specific weight are thrown towards the periphery of the accumulator container and become deposited there. Containers with rotational symmetry are especially favourable. The thermal charging of the accumulator takes place through a heated bottom.

The same apparatus can be used for the thermal charging of accumulators in which the density of the storage substance is smaller in the crystalline phase than in the liquid phase. In particular, this situation is true for ice. Any device which generates angular motion can be used for the thermal charging of such accumulators.

DESCRIPTION OF THE DRAWINGS

FIG. 1a is a cross-section of a thermal storage accumulator constructed according to the invention; and FIG. 1b is a cross-section of the center portion of the accumulator of FIG. 1a.

DESCRIPTION OF THE PREFERRED EMBODIMENT

Figures 1A, 1B:
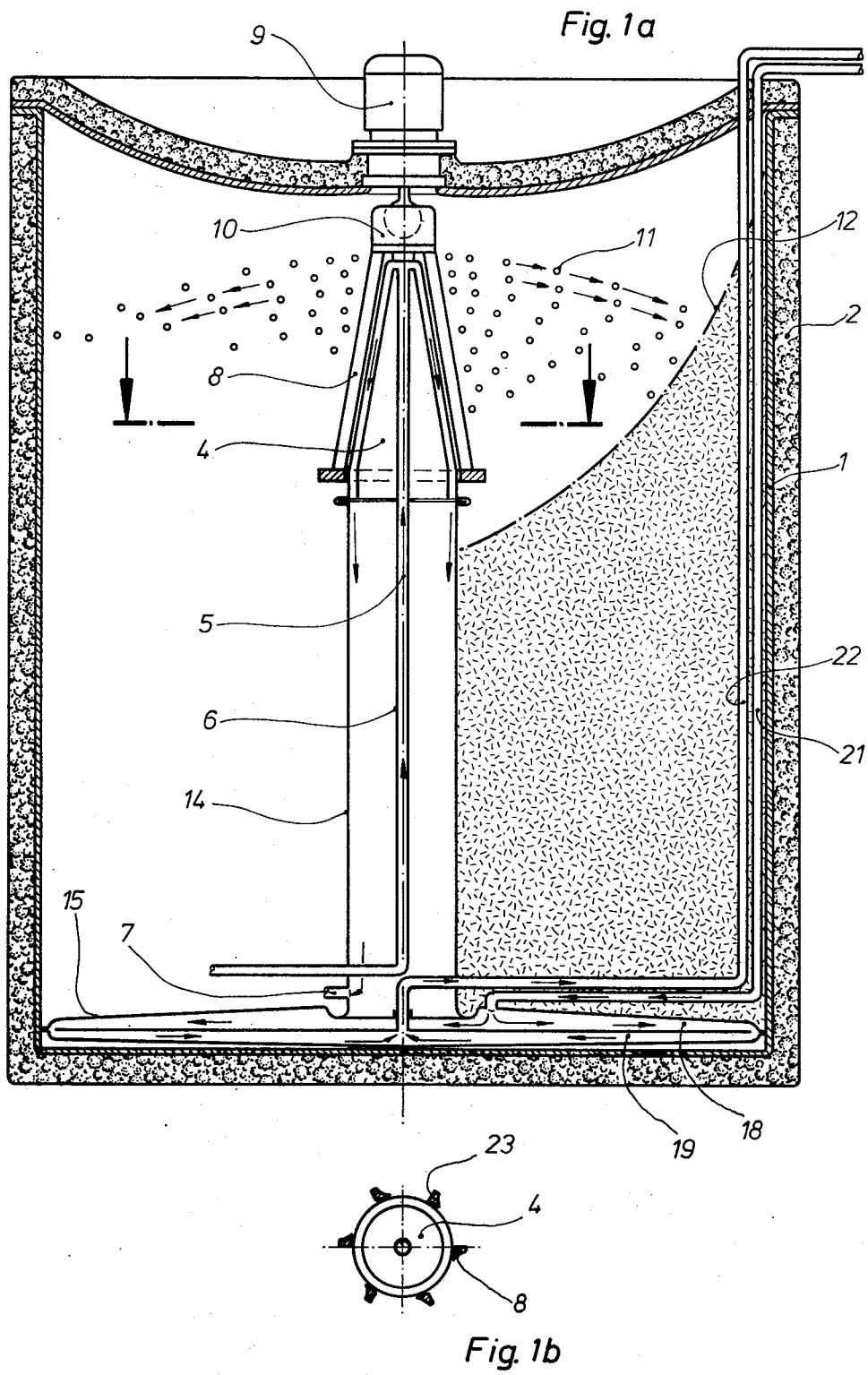

The invention will be described with the help of Figures. FIG. 1a shows the accumulator container 1 surrounded with an insulating layer 2. A heat sink component 4 is situated at the centre of the container. A fluid heat carrier 5 flows through the pipeline 6 into the heat sink body 4 and emerges again through the pipeline 7. Stripping blades 8 are arranged around this thermal discharge heat exchanger which are rotated via a coupling 10 by a motor 9. The stripping blades 8, similarly to the blades of a windscreen wiper, are in contact with the surface of the heat sink component 4 and thus continuously strip off the continuously deposited layer of crystallized storage substance. Simultaneously, these stripping blades generate a fluid vortex, whereby the solid particles 11 in the storage substance are thrown outward and are deposited along the layer surfaces 12 so that not until almost the entire storage substance is thermally depleted does the front face of the solid storage substance portion finally stop the rotation of the stripping blades. The left-hand part of the figure shows the apparatus in the thermally charged state (the storage substance is entirely melted), whilst, on the right-hand side, a partly discharged accumulator is illustrated. With some storage substances, the crust adheres to the stripping blades 8. In this case, the invention provides that the blades slide over the surface of the heat sink component 4, which is shaped as a solid of revolution, under a pre-load, so that, by virtue of the mechanical friction, the blades are subject to a small temperature rise relative to the melt. Another method consists in conducting an electric current via a liquid heat carrier through the stripping blades 8 for the purpose of artificial heating. The heat sink component 4 is mounted on a column 14 so that the component 10, together with the stripping blades, can be withdrawn upwards. The column 14 is connected to a heat exchanger 15, which has two chambers 18 and 19 intercommunicating at the periphery. Heat carrier fluid for melting the storage substance enters through the pipeline 21. The cooled heat carrier emerges again through the pipeline 22.

FIG. 1b shows a cross-section through the stripping blades 8 and through the heat sink component 4. The stripping blades 8 are made hollow. A fluid heat carrier for heating the blades can be conducted through the duct 23.

I claim:

1. Apparatus for thermally discharging a heat storage accumulator containing a fusible storage substance the density of which in the solid state is larger than in the liquid state, characterized in that the accumulator has a heat transfer component located at the center of the accumulator, a heat exchange component located at the bottom of the accumulator and through which a fluid heat carrier is conducted and where the heat exchange component is subdivided by an intermediate wall into two chambers which intercommunicate along the periphery of the component, and means for producing an angular motion of the storage substance in its liquid state around said heat transfer component.

2. Apparatus for thermally discharging a heat storage accumulator where said accumulator has a heat sink portion at its center and contains a meltable heat storage substance which in its solid state has a higher density than in its liquid state, said apparatus comprising rotatable scraper means for contacting and removing crystallized storage material from the surface of said heat sink portion and for imparting a vortex motion to said heat storage substance in its fluid state whereby crystallized portions of said heat storage substance removed from said heat sink surfaces are conveyed by centrifugal forces to an inner periphery of said accumulator.

3. Apparatus according to claim 2 wherein said heat sink portion is formed as a solid of revolution and wherein said scraper means comprise stripping blades rotatable about and contacting said heat sink portion.

4. Apparatus according to claim 3 wherein said stripping blades are heated.

5. Apparatus according to claim 2 wherein said heat transfer portion is mounted on a column which is fixed at the bottom of the accumulator.

6. Apparatus according to claim 5 having in addition a heat exchange component at the bottom of said accumulator and through which a fluid heat carrier is conducted.

7. A method of thermally discharging heat from a heat storage accumulator having a heat sink portion therein and which contains a molten heat storage substance having a greater density in its solidified state than in its molten state, comprising the steps of crystallizing the storage substance on said heat sink portion, scraping said heat sink portion to remove the crystals therefrom and imparting a vortex motion to the molten storage substance whereby crystallized portions of the storage substance are moved by centrifugal forces radially outwardly and away from said heat sink portion.

* * * * *